United States Patent [19]

Satterthwaite

[11] 4,455,468

[45] Jun. 19, 1984

[54] PROCESS AND DEVICE FOR SPLICING METAL SHAFTS BY ARC WELDING AND SPLICED SHAFT MADE BY SUCH PROCESS

[76] Inventor: J. Glenn Satterthwaite, 1538 Lea View Ave., Norfolk, Va. 23503

[21] Appl. No.: 282,297

[22] Filed: Jul. 10, 1981

[51] Int. Cl.³ ........................ B23K 9/00; B23K 31/08
[52] U.S. Cl. ..................................... 219/58; 219/106; 219/137 R; 403/272; 428/574; 428/584
[58] Field of Search ................ 219/104, 106, 107, 57, 219/58, 137 R, 105; 285/22; 403/270, 271, 272; 428/574, 584

[56] References Cited

U.S. PATENT DOCUMENTS

| | | | |
|---|---|---|---|
| 2,195,256 | 3/1940 | Palmer | 29/148.4 |
| 3,024,347 | 3/1962 | Esser | 219/106 |
| 3,171,013 | 2/1965 | Danhier | 219/137 R |
| 3,770,302 | 11/1973 | Hallenbeck | 219/137 R |
| 4,164,311 | 8/1979 | Swisher | 228/161 |

FOREIGN PATENT DOCUMENTS 973477  3/1960  Fed. Rep. of Germany ...... 219/105

Primary Examiner—C. C. Shaw
Assistant Examiner—Alfred S. Keve
Attorney, Agent, or Firm—Pollock, Vande Sande & Priddy

[57] ABSTRACT

An improved process is disclosed for splicing metal shafts, in which a pair of shafts (10, 12 or 44, 46) having transverse end surfaces (30, 32 or 54, 56) preferably substantially normal to the axes of the shafts, are positioned coaxially with an insert (34, 48) positioned between and abutted to the end surfaces. The insert is tapered or wedge-shaped at either end to define transverse contact surfaces (18) which abut the end surfaces of the shafts. The angle ($\beta$) of the taper on the insert permits insertion of a consumable arc welding electrode (20) into the convergent space defined between the end surfaces of the shafts and the tapered surfaces of the insert and is large enough to allow the arc welding electrode to be positioned at locations not only sufficiently spaced from both the tapered surfaces and the end surfaces but also sufficiently close to the area of abutment between the contact and end surfaces, to ensure proper welding penetration into the base metals. Expensive machining of the ends of the shafts themselves, as practiced in the prior art, is avoided by the use of the insert. Alternatively, one shaft may be machined to a tapered or wedge-shaped configuration (42) and the other shaft left in its as-sawed condition, a technique which embodies certain novel aspects of the invention but eliminates the need for an insert.

22 Claims, 9 Drawing Figures

PROCESS AND DEVICE FOR SPLICING METAL SHAFTS BY ARC WELDING AND SPLICED SHAFT MADE BY SUCH PROCESS

DESCRIPTION

1. Technical Field

The present invention relates in general to the art of splicing metal shafts to provide a single shaft of desired, greater length. More particularly, the invention concerns a process and device useful for splicing metal shafts by arc welding and also concerns a spliced shaft produced by such a process.

2. Background Art

In many segments of modern industry, metal shafts and bars are used in a variety of applications such as static supports, rotating power shafts and the like. Such shafts or bars are available in a variety of materials depending upon the intended application, in solid and tubular cross-sections of various geometrics, and in many lengths and effective diameters. On occasion, a need arises for a shaft having a length not readily available from a manufacturer or supplier. Where a shaft longer than that needed is available, the ultimate user may be forced to purchase the longer shaft and have it cut to the desired length, in which case the excess portion of the shaft is often discarded. Where rather inexpensive materials such as carbon steel are used, the additional expense may be quite nominal; however, where a material such as stainless steel is used, the additional expense can be considerable. On the other hand, where no shaft is available having a length at least equal to that required, it has been generally acceptable to machine the ends of shorter shafts to provide a suitable weld preparation and then splice the shafts by arc welding.

The geometries of various prior art weld preparations used for splicing metal shafts are illustrated in FIGS. 1, 2 and 3 of this application. For one popular weld preparation, a conical taper is machined on one end of each shaft, leaving a small, substantially flat, transverse contact surface at the tip of the taper. The two shafts are then abutted coaxially at their tapered ends and securely fixed to maintain concentricity and axial alignment. With the shafts positioned substantially horizontally, the consumable arc welding rod or electrode is directed downwardly toward the center line of the shafts, typically at an angle substantially normal to their common axis. It has long been recognized that by positioning the consumable electrode in this manner, excellent wetting, or puddling, of the molten electrode metal and base metal is achieved surrounding the arc between the electrode and the abutted shaft ends. Such high penetration of weld metal into the base metal results in a high quality joint having few defects. In another known weld preparation, the ends of the shafts are tapered into flat-sided wedges similar to the shape of a chisel point, the wedges also having small transverse contact surfaces which are abutted before welding begins. See FIG. 2. The flat sides of the wedge in some instances are replaced by opposed J-shaped surfaces which terminate at the contact surface. See FIG. 3. Other types of weld preparations also are used. In all cases known to the applicant, however, the generally accepted prior art arc welding practice has been that good penetration is best achieved when the weld metal is deposited directly downwardly onto the surface of the base metal. Thus, prior art welding techniques have required that the ends of shafts to be spliced must be extensively machined to permit the shafts to be butted together horizontally at the centers of their cross-sections so that the weld metal can be deposited directly downwardly onto the base metal throughout the full length of the welded joint.

Where shafts of less than five inches in diameter are to be spliced, the provision of such weld preparations on the ends of two shafts and the welding of the shafts using prior art techniques can be achieved at acceptable cost and without too much difficulty in maintaining concentricity and axial alignment of the shafts. However, the cost of preparing the ends of the shafts and the cost of the fixturing necessary to position the shafts increase substantially in proportion to the square of the diameter of the shafts. Thus, the cost of splicing two three-inch diameter shafts to provide a single shaft of a desired length may compare favorably to the cost of purchasing a single three-inch shaft of equal length. However, when prior art techniques for welding shafts are used to join two nine-inch shafts, the cost of the resultant splice would be at least nine times greater than that of the three-inch shaft. As a result, the cost of the spliced nine-inch shaft does not compare favorably with that of a single nine-inch shaft of equal length.

Another disadvantage of prior art processes for welding two shafts arises from the requirement that the shafts be turned or rotated during the early stages of the welding process in order (a) to permit the welder to maintain the preferred orientation of the welding rod in which weld material is deposited directly downwardly onto the base metal, and (b) to maintain continuity of the weld material as it is deposited around the full circumference of the weld preparation. Because such rotation is required, it is extremely difficult to maintain the shafts in proper, concentric alignment during the entire welding process. Maintenance of such concentric alignment is essential if the shafts to be spliced already have the desired finished diameter, thus making it very difficult to correct misalignments following completion of the welding process. In addition, when shafts of finished diameter are welded, circumferential lines of demarcation remain following clean-up machining of the weld material, which detract from the appearance of the finished shaft. For at least these reasons, shafts of finished diameter have seldom been spliced using prior art welding procedures. Rather, prior art welding procedures have most often required the two shafts to be slightly oversized in diameter to allow the spliced shaft to be turned in a lathe throughout its entire length, in order to remove excess weld material, restore acceptable straightness, and remove any lines of demarcation.

Due to the previously described complications of using prior art welding procedures, splicing shafts by welding is not particularly common and is usually done only where time does not permit purchase of a one-piece shaft of the desired length. Alternatives such as the use of precision fitted sleeve couplings are known; however, such couplings are expensive and their use engenders other types of problems. Thus, a need has existed for many years for a simple, accurate and dependable process for splicing lengths of shafting by arc welding in an economical manner which permits welding of shafts of both finished and oversize diameter while maintaining true concentricity and straightness of the splied shaft.

DISCLOSURE OF THE INVENTION

The primary object of the present invention is to provide an improved, greatly simplified process for splicing steel bars and shafts by arc welding, in which the ends of the shafts to be joined remain in their flat or as-sawed condition and require minimal preparation prior to welding.

A further object of the present invention is to provide such a process which is suitable for splicing shafts of finished diameter while maintaining true concentricity and alignment between the shafts being spliced, thus assuring acceptable straightness and dimensional tolerances of the spliced shaft.

Yet another object of the present invention is to provide such a process in which the welded joint between the shafts is of very high quality and exterior appearance, being capable of passing the most stringent destructive and non-destructive tests.

Yet another object of the invention is to provide such a process in which a simple, easily machined metal insert is positioned between the as-sawed ends of the shafts, the ends of the insert having a tapered or wedge-shaped configuration which abuts the as-sawed ends of the shafts.

A still further object of the invention is to provide such a process in which the insert positioned between the as-sawed ends of the shafts and the electrode rod used during arc welding are made, respectively, of a material identical to that of the base metal of the shafts, and a material comparable to the base metal in the as-welded condition.

Still another object of the present invention is to provide such a process in which the amount of weld material deposited during splicing is equal to or less than that used in prior art processes.

These objects of the invention are given only by way of example; therefore, other desirable objectives and advantages inherently achieved by the disclosed process and device may occur or become apparent to those skilled in the art. Nonetheless, the scope of the invention is to be limited only by the appended claims.

In the process according to the invention, two shafts are provided which may be of the same or different diameters and also may be of the desired finished diameter. Preferably, each of the shafts is provided with a transverse end surface which is substantially normal to its axis. Typically, the ends of the shafts will be in their as-cut or as-sawed condition in which the end surface has a relatively rough finish of, for example, 250 rms or greater. By "substantially normal" is meant that the end surface of the shaft preferably is no more than 10° away from perpendicular to the axis of the shaft. However, the end surfaces of the shafts may be cut at greater angles from the axis of the shaft, so long as a welding insert of the type disclosed herein can be abutted between the shaft ends before welding proceeds, without departing from the scope of this aspect of the present invention. In most cases, for the sake of expendiency, the as-sawed end surfaces will be nearly normal to the axis of the shaft.

Such shafts are positioned coaxially, horizontally with their end surfaces spaced from each other. Between the end surfaces, an insert is positioned which has opposite ends tapered to define contact surfaces which abut the end surfaces. These opposite ends are tapered at angles which allow insertion of a consumable arc welding electrode into the convergent space defined between the end surfaces and the opposite ends of the insert. The angles of the tapered surfaces of the insert are large enough to allow the consumable arc welding electrode to be positioned at locations not only sufficiently spaced from the tapered surfaces and the end surfaces but also sufficiently close to the area of abutment between the contact and end surfaces, to ensure proper welding penetration into the base metals. Preferably, the insert has a length equal to the smaller diameter of the two shafts and a diameter equal to one-half the smaller diameter of the two shafts. After an insert of this type has been welded to the end surfaces of the shafts to an extent equal to the diameter of the insert, the assembly of shafts and insert may be rotated to complete the welded joint without significant loss of concentricity or straightness.

In a particularly preferred embodiment of the invention, the insert is cylindrical and its opposite ends are tapered by at least one relatively flat surface set at an angle to the axis of the insert to define a wedge-shape terminating at one of the contact surfaces. When such an insert is used, the flat surfaces which define its wedge-shaped ends may be positioned in vertical planes to facilitate initial welding from both sides of the insert or in horizontal planes to minimize the effect of gravity during welding. Of course, the insert may also be positioned with the flat surfaces at any intermediate position without departing from the scope of the present invention.

When finished diameter shafts are to be welded in accordance with the process of the present invention, the peripheral edges of the end surfaces of the shafts are radially upset, preferably before welding commences. Thus, weld material can be deposited to the full diameter of the upset edges of the end surfaces. Following welding, the excess weld material and the upset edges are machined or ground away leaving a welded shaft of finished diameter without any discernible lines of demarcation between the weld material and the parent material.

In the process according to the invention, the shafts preferably are positioned horizontally during welding so that their end surfaces are located in vertical or nearly vertical planes. As previously indicated, the insert between the end surfaces also can be positioned so that at least some of the surfaces which define its tapered ends also are positioned in a vertical or nearly vertical plane. When weld material is to be deposited on such nearly vertical surfaces, the consumable arc welding electrode preferably is positioned at an angle greater than 30° away from the surface, thereby ensuring that adequate wetting or penetration is achieved into the base metal. Although the process according to the present invention is particularly suited for welding shafts having solid metal cross-sections, it also can be used to weld those having annular or tubular cross-sections. In such a case, the insert positioned between the shafts is annular in configuration and has opposite ends tapered to define annular contact surfaces which abut the as-sawed annular end surfaces of the tubular shafts.

Although the preferred process according to the invention requires the use of an insert positioned between the as-sawed ends of the shafts, it is also within the scope of the invention to leave one shaft in its as-sawed condition and to taper the end of the other shaft to define a contact surface which abuts the as-sawed end surface of the one shaft. In this case, considerable economy is achieved since only one shaft, usually the shorter one, requires special machining prior to welding; however, for shafts of relatively large diameters, it is more economical to use the previously described insert.

An insert according to the present invention is particularly suited for use in arc welding together two metal shafts having end surfaces which are substantially normal to their axes. Such an insert comprises a metal body having an axis and opposite ends tapered to define transverse contact surfaces which, in use, abut the end surfaces of the shafts. The opposite ends are tapered at angles relative to the axis of the insert which allow insertion of a consumable arc welding electrode into the convergent space defined, in use, between the end surfaces of the shafts and the opposite ends of the insert. The ends of the insert are tapered at angles large enough to allow the consumable electrode to be positioned at locations not only sufficiently spaced from the tapered surfaces and the end surfaces but also sufficiently close to the area of abutment between contact and end surfaces of shafts to ensure proper welding penetration into the base metals. The insert may be solid cylindrical or annular in cross-section. In the solid cylindrical form, the opposite ends may be tapered by machining them to a conical configuration or by providing at least two flat surfaces set at angles to the axis of the insert to define a wedge shape terminating at a contact surface. Inserts having different taper geometries at their opposite ends are also within the scope of the invention.

A shaft spliced in accordance with the process of the present invention has an exterior appearance and physical properties which are macroscopically indistinguishable from those of a single unwelded shaft. When a welded shaft according to the invention is cut at the joint and inspected microscopically, differences in the metallographic structures of the weld material and the base metal can be discerned; however, these differences do not affect the performance of the shaft.

BEST MODE FOR CARRYING OUT THE INVENTION

Figure 1:
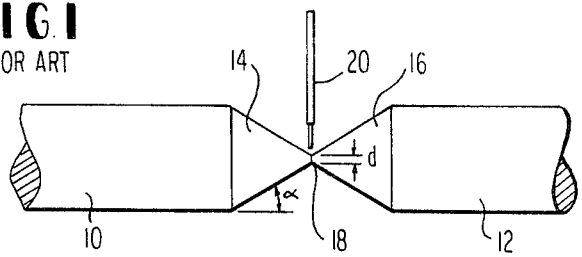
FIG. 1 shows a side elevation view of shafts provided with conical weld preparations of the type used in the prior art.

The following is a detailed description of the preferred embodiments of the invention, reference being made to the drawings in which like reference numerals identify like elements of structure in each of the several Figures.

Figure 2:
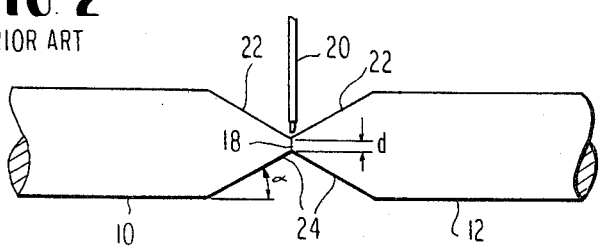
FIG. 2 shows a side elevation view of shafts provided with wedge-shaped weld preparations of the type used in the prior art.
Figure 3:
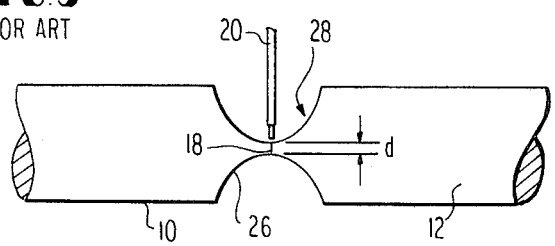
FIG. 3 shows a side elevation view of shafts provided with double-J weld preparations of the type used in the prior art.

FIGS. 1 to 3 illustrate schematically various prior art weld preparations used for splicing two shafts. In FIG. 1, solid cylindrical metal shafts 10 and 12 have been provided with conical end surfaces 14 and 16 which terminate in substantially flat, transverse contact surfaces 18 typically having a diameter d of one-eighth to one-fourth of an inch. The angle $\alpha$ of conical end surfaces 14, 16 ordinarily has been in the range of 30° to 45°. During welding, the contact surfaces 18 of the two shafts are abutted as illustrated and the shafts are mounted in suitable fixtures which maintain their axes in alignment. A consumable arc welding electrode 20 is shown schematically in the upright position preferred in the prior art for depositing weld material downward onto conical end surfaces 14, 16. In order to maintain welding electrode 20 in the preferred upright position, it is necessary that shafts 10 and 12 be rotated early in the welding process, thereby introducing the previously mentioned problems of maintaining concentricity and straightness, which are caused by distortion during welding. FIG. 2 illustrates another prior art weld preparation in which shafts 10 and 12 are provided with wedge or chisel shaped preparations typically formed by converging surfaces 22, 24 positioned on opposite sides of the axes of the shaft to define transverse contact surfaces 18. Usually, such wedge shaped end surfaces are symmetrical in configuration with the surfaces 22, 24 being positioned at an angle $\alpha$ of 30° to 45°. In this case, contact surfaces 18 are narrow rectangles which extend across the diameter of the shaft on their long side and have a radial width UND/d/ of one-eighth to one-fourth of an inch on their short side. Because the use of such wedge shaped preparations is known in the art, no specific illustration of the geometry of contact surfaces 18 has been provided. In FIG. 3, a variant of the weld preparation shown in FIG. 2 is illustrated. Here, contact surfaces 18 are defined by a pair of double-J grooves 26, 28 in the familiar manner. Shafts having weld preparations of the type illustrated in FIGS. 2 and 3 are positioned horizontally with contact surfaces 18 in abutment, after which weld material is deposited downwardly onto surfaces 22, 24 and 26, 28. When one side of the weld preparation has been substantially filled with weld material, the shafts are released, rotated 180° and reclamped to permit deposition of weld material on the other side.

Figure 4:
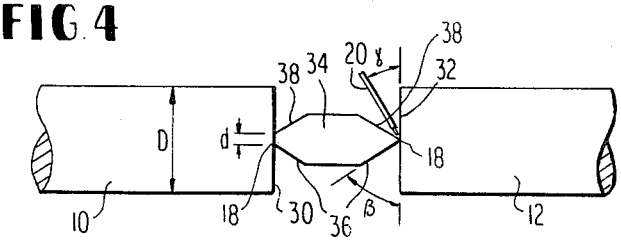
FIG. 4 shows a side elevation view of shafts having as-sawed end surfaces which abut a welding insert according to the present invention.
Figure 5:
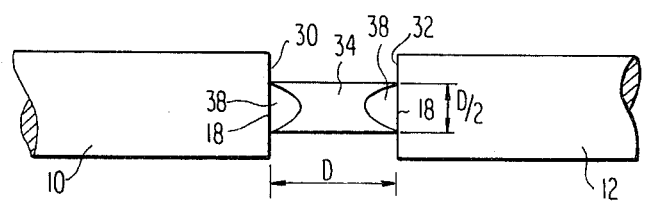
FIG. 5 shows a top view of the structure shown in FIG. 4.

FIG. 4 and 5 illustrate one weld preparation used in the process according to the present invention. In this case, solid cylindrical metal shafts 10, 12 retain their as-sawed, transverse end surfaces 30, 32 which preferably are substantially normal to the axes of the shafts. Positioned between and abutted to end surfaces 30, 32 is the unique welding insert 34 according to the present invention. Insert 34 preferably is made from a length of cylindrical metal stock of the same material as that of shafts 10 and 12. Preferably, the opposite ends of insert 34 are tapered by angled surfaces 36, 38 which define a wedge or chisel shaped end terminating at transverse contact surface 18. Preferably, surfaces 36, 38 are positioned directly opposite each other on opposite sides of the axis of insert 34 to define a symmetrically shaped wedge at each end of the insert; however, complete symmetry about the axis of the insert is not required so long as the maximum radial dimension $\underline{d}$ of contact surfaces 18 is small enough to permit a full penetration weld.

Although precise symmetrical orientation of angled surfaces 36, 38 is not required, the angle $\beta$ formed between surfaces 36, 38 and end surfaces 30, 32 of shafts 10 and 12 is determined with care in accordance with the present invention. FIG. 4 shows a side elevation view of shafts 10 and 12 with insert 34 positioned between end surfaces 30, 32 so that the convergent space defined between angle surfaces 36, 38 and end surfaces 30, 32 terminates at a substantially horizontal line where contact surfaces 18 abut end surfaces 30, 32. Those skilled in the welding art have recognized for some time that arc welding to a substantially vertical surface is possible and that excellent penetration, or wetting, of the vertical surface by weld material can be achieved provided that the angle $\gamma$ between the substantially vertical surface and the axis of the consumable arc welding electrode is greater than approximately 30°. Thus, with insert 34 positioned as illustrated in FIGS. 4 and 5, it is necessary according to the invention that angle $\beta$ be from 45° to 50° in order that welding rod 20 may be positioned conveniently at the required angle relative to end surfaces 30, 32.

If insert 34 is rotated 90° from the position illustrated in FIGS. 4 and 5, then, in the illustrated symmetric embodiment, angled surfaces 36, 38 also will be oriented in substantially vertical planes. This alternate orientation of insert 34 has the advantage that weld material can be deposited simultaneously on both sides of the insert; whereas, in the embodiment illustrated in FIGS. 4 and 5, weld material is deposited first on one side and then on the opposite side of insert 34. However, if insert 34 is rotated in the manner just discussed, then angle $\beta$ must be in the range of 60° to 70° to permit welding electrode 20 to be positioned at least 30° from both angled surfaces 36, 38 and end surfaces 30, 32.

To simplify handling and machining of insert 34 and also to reduce the amount of weld material which must be deposited to complete the joining of shafts 10 and 12, insert 34 preferably has an overall length approximately equal to the smaller diameter D of the shafts and an overall diameter approximately equal to one-half of the smaller diameter D. This preferred size of insert 34 also ensures that when the convergent spaces defined between angled surfaces 36, 38 and end surfaces 30, 32 have been filled with weld material and allowed to cool, the resultant partially completed splice will be of adequate strength to permit free rotation of shafts 10 and 12 as the weld is completed, without loss of concentricity and straightness. Although insert 34 is shown in FIGS. 4 and 5 with wedge or chisel shaped end surfaces, it should be understood that any of the tapered end geometries shown in FIGS. 1-3 or any combination of them may also be used on insert 34 without departing from the scope of the present invention, provided adequate access space results for welding rod 20.

Once insert 34 has been positioned between shafts 10 and 12 with contact surfaces 18 in abutment with end surfaces 30, 32, welding can proceed. While maintaining angle $\gamma$ between consumable arc welding electrode 20 and the essentially vertical end surfaces 30, 32 and, if necessary, between angled surfaces 36, 38, weld material is deposited until the previously mentioned convergent spaces have been filled on at least one side of insert 34. After the weld material thus far deposited has had an opportunity to cool and shrink in the usual manner, shafts 10 and 12 may be released from the fixtures required to position them for initial welding, rotated 180° and reclamped as necessary to complete the weld on the opposite side of the insert prior to release for free rotation. Due to the unique geometry of insert 34, the partially completed weld will then have sufficient strength to withstand any distortion forces which may be introduced as the shafts are rotated, or as stresses are induced by the heat of further welding, and still maintain the necessary concentricity and alignment of shafts 10 and 12.

Figure 6:
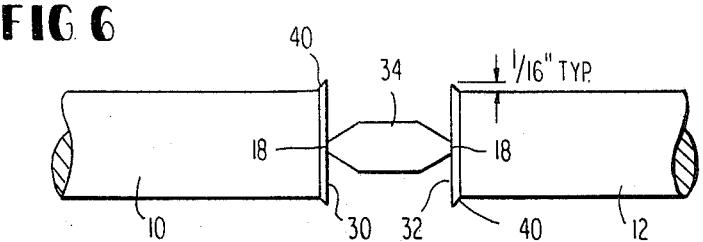
FIG. 6 shows a side elevation view of shafts having as-sawed end surfaces which abut a welding insert according to the invention, the edges of the end surfaces of the shafts having been radially upset prior to welding.

FIG. 6 illustrates a modified weld preparation for use in accordance with the present invention. In this case, shafts 10, 12 and insert 34 are identical to those previously discussed. The difference is that the peripheral edges of end surfaces 30, 32 have been provided with radially extending, circumferential upset portions 40 which extend, for example, approximately one-sixteenth of an inch beyond the outer diameter of shafts 10 and 12. A pneumatic hammer can be used to form upset portions 40, which are provided on shafts 10 and/or 12 before welding begins, when at least one of the shafts already has the desired finished diameter. Weld material is then deposited between the shafts at least to the radially outermost edge of upset portions 40. Thereafter, the excess weld material and upset portions 40 are machined or ground away leaving a single shaft having the desired finished diameter but no visible line of demarcation between weld material and the base metal of original shafts 10 and 12.

Figure 7:
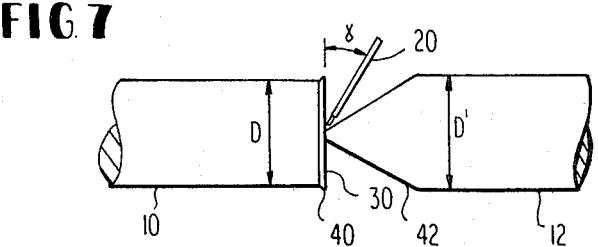
FIG. 7 shows a side elevation view of shafts, one of which has an as-sawed end surface provided with radially upset edges and one of which has a wedge-shaped end which abuts the as-sawed end surface of the other.

FIG. 7 illustrates a side elevation view of a weld preparation according to the present invention which may be used to join one shaft 10 having an essentially flat end surface 30 to another shaft 12 having a somewhat larger diameter D' and a tapered end configuration defined by a pair of angled planes 42 which terminate at a contact surface 18. In this case, weld material is deposited in the convergent space defined between angle surfaces 42 and end surface 30 until at least the radially outermost edge of upset portion 40 is reached. Thereafter, excess weld material, upset portion 40 and the excess material on shaft 12 are machined away to provide a shaft of the desired finish diameter D.

Figure 8:
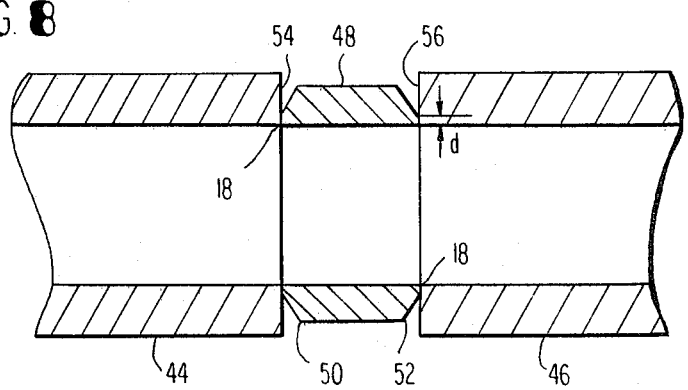
FIG. 8 shows a sectional view of a pair of tubular shafts having as-sawed end surfaces which abut a tubular weld insert according to the present invention.
Figure 9:
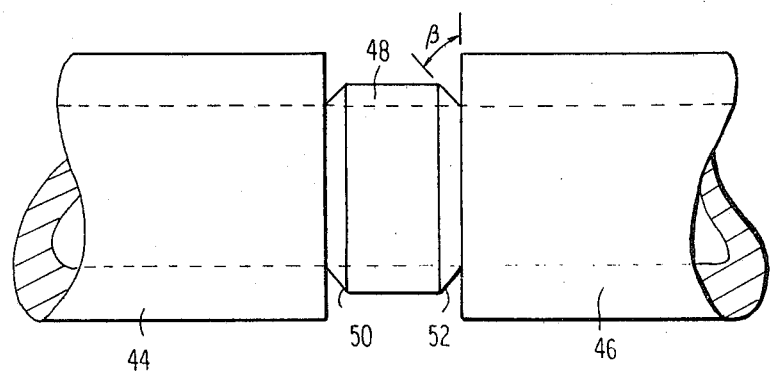
FIG. 9 shows a side elevation view of the structure of FIG. 8.

FIGS. 8 and 9 illustrate another application of the process according to the invention in which a pair of tubular shafts 44, 46 having an annular, circular cross-section or other annular cross-section are abutted to an annular insert 48 having tapered ends defined by circumferential chamfers 50, 52. Radially extending circumferential contact surfaces 18 are provided which abut the essentially vertical end surfaces 54, 56 of tubular shafts 44, 46. During welding, weld material is deposited between chamfered surfaces 50, 52 and end surfaces 54, 56 along from 90° to 120° of the circumference of the tubular shaft before the shafts are rotated to permit completion of the weld.

INDUSTRIAL APPLICABILITY

While the process, insert and shaft according to the present invention have been disclosed with regard to cylindrical shafting having solid or annular cross-sections, those skilled in the welding arts will understand that shafting having oval, elliptical, regular or irregular polygonal and other circumferential configurations also may be welded in accordance with the present invention.

Having described my invention in sufficient detail to enable those skilled in the art to make and use it, I claim:

1. A process of splicing two metal shafts having solid cylindrical cross-sections by means of electric arc welding in which a consumable electrode is used both to pass current to the welding site and to provide filler material for the welded joint, said process comprising the steps of:

providing each of said shafts with an as-cut end surface transverse to its axis;

placing between said as-cut end surfaces a metal insert having a solid cylindrical cross-section, an axis and opposite ends, said insert being tapered toward each of said opposite ends by at least one surface at each of said opposite ends, said at least one surface being set at an angle to said axis of said insert to define at each said opposite end a contact surface, each said contact surface abutting one of said as-cut end surfaces, said opposite ends of said insert each being tapered by said at least one surface at angles which allow insertion of a consumable arc welding electrode into the convergent space defined between said as-cut end surfaces of said shafts and said opposite ends of said insert, said angles being such that said consumable arc welding electrode may be positioned in said convergent space at locations sufficiently spaced from both said opposite ends of said insert and said as-cut end surfaces and also sufficiently close to the point of abutment of said contact surfaces with said as-cut end surfaces, to ensure proper electric arc welding with a consumable arc welding electrode; and joining said shafts and said insert to provide a single shaft by electric arc welding in which a consumable electrode is inserted into said convergent space.

2. A process according to claim 1, wherein each of said opposite ends is tapered by said at least one surface set at an angle to the exis of the insert to define a wedge shape terminating at one of said contact surfaces, further comprising the step of positioning at least one of said surfaces defining said wedge in a vertical plane to facilitate initial welding of said insert to said end surfaces of said shafts.

3. A process according to claim 1, wherein said shafts are of the same finished diameter, further comprising the steps of radially upsetting the edges of said as-cut end surfaces prior to completion of said joining step; and following completion of said joining step beyond said finished diameter, removing weld metal and the upset edges whereby said single shaft has a diameter along its length equal to said finished diameter.

4. A process according to claim 2, further comprising the step of positioning said insert coaxially with said shafts; and turning said shafts and said insert following welding of said insert to said end surfaces to facilitate completion of said welding.

5. A process according to claim 1, wherein the angle of said consumable arc welding electrode to said as-cut end surfaces is greater than 30°.

6. A process according to claim 1, wherein said as-cut end surfaces are substantially normal to the axis of said shafts.

7. A process according to claim 1, wherein said shafts have equal diameters and said insert has overall length equal to said diameter and a radius equal to at least one-fourth of said diameter.

8. A process according to claim 2, wherein there are two substantially flat surfaces at each of said opposite ends, said flat surfaces being at equal angles to and on diametrically opposite sides of the axis of said insert.

9. A process according to claim 1, wherein each of said opposite ends is tapered by at least one surface set at an angle to the axis of the insert to define a wedge shape terminating at one of said contact surfaces, further comprising the step of positioning said insert so that said at least one surface defining said wedge is in a horizontal plane, to facilitate initial welding of said insert to said as-cut end surfaces of said shafts.

10. A process according to claim 9, wherein said shafts are of the same finished diameter, further comprising the steps of radially upsetting the edges of said as-cut end surfaces prior to completion of said joining step; and following completion of said joining step beyond said finished diameter, removing weld metal and the upset edges whereby said single shaft has a diameter along its length equal to said finished diameter.

11. A process according to claim 9, further comprising the step of positioning said insert coaxially with said shafts; and turning said shafts and said insert following welding of said insert to said end surfaces to facilitate completion of said welding.

12. A process according to claim 9, wherein the angle of said consumable arc welding electrode to said end surface is greater than 30°.

13. A process according to claim 9, wherein said end surfaces are substantially normal to the axis of said shafts.

14. A process according to claim 9, wherein said shafts and said insert are of solid cross-section.

15. A process according to claim 9, wherein said shafts have equal diameters and said insert has an overall length equal to said diameter and a radius equal to at least one-fourth of said diameter.

16. A process according to claim 9, wherein there are two substantially flat surfaces at each of said opposite ends, said flat surfaces being at equal angles to and on diametrically opposite sides of the axis of said insert.

17. A metal shaft manufactured in accordance with the process recited in claims 1, 2, 3, 4, 5, 6, 7, 8, 9, 10, 11, 12, 13, 14, 15 or 16.

18. An insert for use in splicing two solid cylindrical metal shafts having end surfaces transverse to the axes of said shafts, to form a single shaft by means of electric arc welding in which a consumable electrode is used both to pass current to the welding site and to provide filler material for the welded joint, said insert comprising:

a solid cylindrical metal body having an axis and opposite ends, said body being tapered toward each of said opposite ends by at least one surface at each of said opposite ends, said at least one surface being set at an angle to said axis to define at each said opposite end a contact surface means for abutting the end surfaces of the shafts in use of said insert, said opposite ends each being tapered by said at least one surface at angles relative to said axis which allow insertion of a consumable arc welding electrode into the convergent space defined in use of said insert between the end surfaces of the metal shafts and said opposite ends, said angles being such that said consumable arc welding electrode may be positioned in such convergent space at locations sufficiently spaced from both said opposite ends of said insert and the as-cut end surfaces of the metal shafts and also sufficiently close to the point of abutment of said contact surfaces with the as-cut end surfaces to ensure proper joining with a consumable arc welding electrode.

19. An insert according to claim 18, wherein each of said opposite ends is tapered by at least one flat surface set at an angle to the axis of said insert to define a wedge shape terminating at one of said contact surfaces.

20. An insert according to claim 18, wherein said insert is solid in cross-section.

21. An insert according to claim 18, wherein said insert has an overall length equal to the diameter of said shafts and a radius equal to at least one-fourth said diameter.

22. An insert according to claim 18, wherein there are two substantially flat surfaces at each of said opposite ends, said flat surfaces being at equal angles to and on diametrically opposite sides of the axis of said insert.

* * * * *